United States Patent Office 2,775,213
Patented Dec. 25, 1956

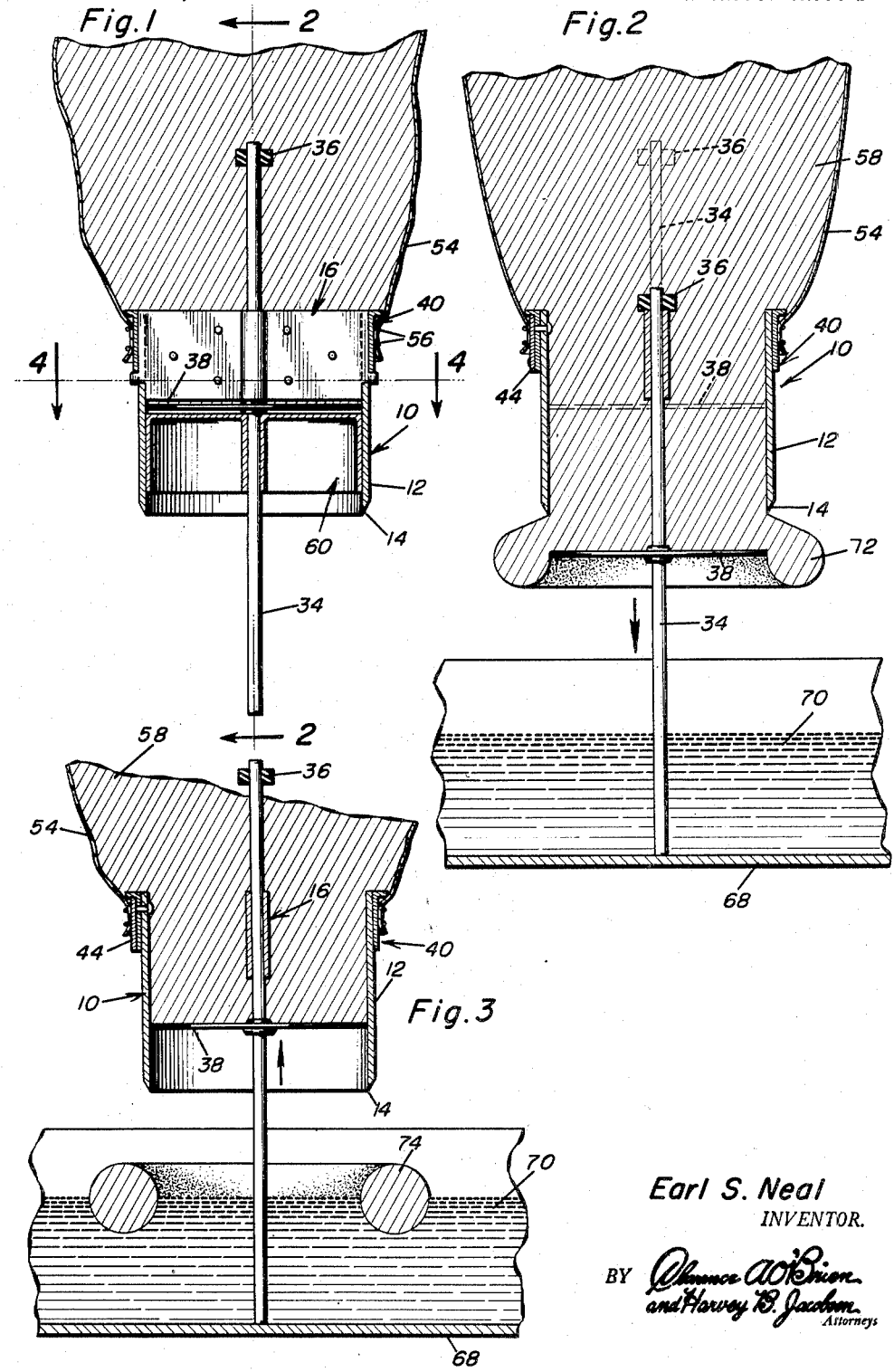

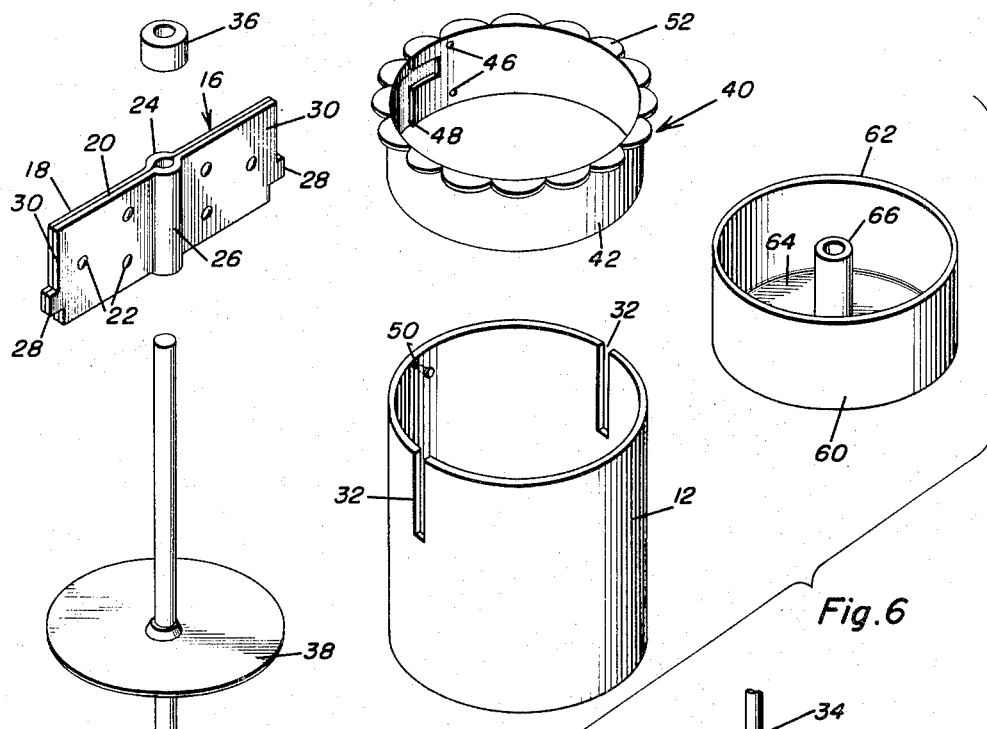
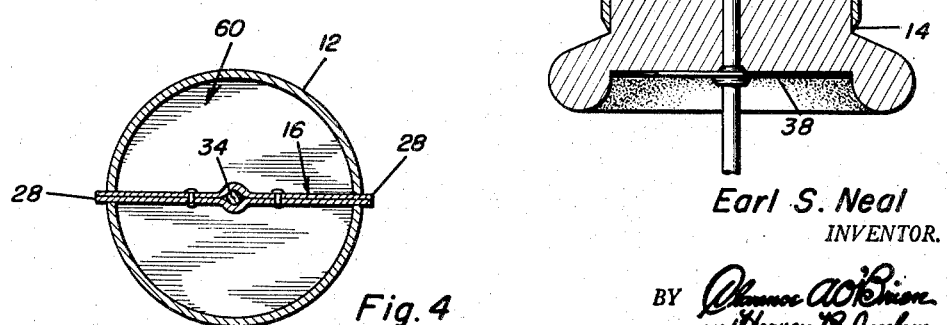

2,775,213
DISPENSER
Earl S. Neal, San Francisco, Calif.
Application February 10, 1954, Serial No. 409,491
3 Claims. (Cl. 107—14)

This invention relates in general to cooking equipment, and more specifically to a doughnut dough dispenser.

There have been devised numerous devices for dispensing dough in the formation of doughnuts which will automatically form the desired shape of dough to produce a doughnut. However, the main drawback of all of these dispensing devices is the fact that the nature of the dispensing head thereof is such that a relatively large amount of dough remains in the dispensing head after the dough container has been emptied. This dough must be either wasted or must be formed by hand, which requires the dirtying of many other cooking accessories.

It is therefore the primary object of this invention to provide an improved dispensing head for dough containers for the producing of doughnuts, the dispensing head being so constructed whereby the waste of dough is minimized.

Another object of this invention is to provide an improved dispensing head for dough containers, the dispensing head being so constructed whereby it may be provided with a cover to seal the dough container with which it is associated.

A further object of this invention is to provide an improved dispensing head for dough containers which may be utilized in the formation of doughnuts, the various portions of the dispensing head being easily disassembled for cleaning purposes, and portions thereof being removable to permit the dispensing of dough from within the dispensing head after the dough container has been removed there from so that all dough may be dispensed therefrom during a doughnut forming operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical sectional view taken through substantially the center of the dispensing head which is the subject of this invention and shows the general relationship thereof with respect to a flexible dough container, the dispensing head being provided with a cover for sealing the dough container;

Figure 2 is a fragmentary vertical sectional view taken in section line 2—2 of Figure 1, the cover being removed and the dispensing head being in the process of dispensing a doughnut into a pan of oil, uppermost position of a stem and valve disk of the dispensing head being shown in dotted lines;

Figure 3 is a fragmentary vertical sectional view similar to Figures 1 and 2 and shows the position of the stem and valve disk immediatley after a doughnut has been formed and dropped into the pan of oil;

Figure 4 is a transverse horizontal sectional view taken substantially upon the plane indicated by the section line 4—4 of Figure 1 and shows the general construction of a guide and the manner in which it is mounted within a tubular body portion of the dispensing head;

Figure 5 is a vertical sectional view taken through the dispensing head with the guide and a cap thereof removed and the cover being inverted and positioned in the upper end thereof to form a plunger to force dough remaining in the dispensing head out thereof in the formation of doughnuts, end portions of the stem being broken away; and Figure 6 is an exploded perspective view of the various elements of the dispensing head and shows the general construction thereof.

Referring now to the drawings in detail, it will be seen that there is illustrated the dispensing head which is the subject of this invention, the dispensing head being referred to in general by the reference numeral 10. The disensing head 10 includes an elongated tubular body member 12 which is circular in cross-section. The tubular body member 12 is provided at its lower end with a sharpened lower edge 14 to facilitate the cutting of dough.

Mounted within the upper portion of the tubular body member 12 is a guide which is referred to in general by the reference numeral 16. The guide is formed by a pair of complementary plates 18 and 20 which are secured together in face-to-face engagement by a plurality of fasteners 22. The plates 18 and 20 have offset central portions 24 and 26 which form a sleeve. The ends of the plates are so constructed so as to provide lugs 28 and outwardly projecting upper end portions 30.

Referring now to Figures 4 and 6 in particular, it will be seen that the upper portion of the tubular body member 12 is provided with diametrically opposite, vertically extending slots 32 which open through the upper end of the tubular body member. The guide 16 is so positionable with respect to the tubular body member 12, that the projecting upper end portions 30 are positionable within the slots 32 and the lugs 28 extend outwardly of the body member 12.

The dispensing head 10 also includes an elongated stem 34. The stem 34 is guidingly received within the sleeve portion of the guide 16. Carried by the upper end of the stem 34 is a stop member 36. The stop member 36 resiliently clamps on the upper end of the stem 34 and is removable therefrom.

Carried by the stem 34 intermediate its ends is a valve disk 38. The valve disk has a diameter substantially equal to the internal diameter of the tubular body member 12. Thus, it will be seen that the valve disk 38 may cooperate with the sharpened lower edge 14 of the tubular body member 12 to facilitate the cutting of dough extruded from the bottom of the tubular body member 12.

The dispensing head 10 also includes a connector which is referred to in general by the reference numeral 40. The connector 40 includes a tubular portion 42 which is receivable over the upper part of the tubular body member 12 and which is seatable on the lugs 28 in the manner best illustrated in Figure 1 to retain the guide 16 in position. The tubular body portion 42 of the connector 40 is formed by a single piece of material having its opposed ends connected together by a strap 44 which is secured in place by suitable fasteners 46. The opposed ends of the piece of material forming the tubular body portion 42 are cut away to form a bayonet notch 48. The upper portion of the tubular body member 12 is provided with an outwardly projecting pin engageable in the bayonet notch 48 to retain the connector 40 thereon. The connecor 40 includes an outwardly projecting scalloped flange 52 at the upper edge thereof to facilitate twisting of the connector 40 to release it from the pin 50.

Referring now to Figures 1, 2 and 3 in particular, it will be seen that the dispensing head 10 is secured to a flexible dough container 54. The flexible dough container 54 is secured to the connector 40 in sealed relation therewith by suitable fasteners 56 which may be rubber bands or the like. It is one of the purposes of this invention to provide a doughnut forming assembly which requires few cooking implements to produce a doughnut. It is intended that the doughnut flour be packed in the container 54 and that by mixing the doughnut flour with water, the dough 58 may be formed. The dough may then be replaced in the container 54 for extrusion therefrom.

Inasmuch as the container 54 will undoubtedly contain more dough 58 than one will normally want to cook at one time, in order that the dough 58 may be saved, the dispensing head 10 is provided with a removable cover which is referred to in general by the reference numeral 60. The removable cover 60 includes a tubular body portion 62 which is of a diameter to have a friction fit within the lower end of the tubular body member 12. The tubular body portion 62 terminates at one end thereof in a transverse end wall 64. The end wall 64 has secured to an underside thereof a depending sleeve 66. The sleeve 66 is disposed entirely within the confines of the tubular body portion 62 and is receivable on the stem 34 in sealing engagement therewith. The dough container sealing position of the cover 60 is best illustrated in Figure 1.

Doughnuts are normally cooked in a pan, such as the pan 68, which is partially filled with an oil 70. In the operation of the dispensing head 10, the dough container 54 is squeezed until a desired amount of dough 58 is extruded around the valve disk 38, as is best illustrated at 72 in Figure 2. The lower end of the stem 34 is then engaged with the bottom of the pan 68 and the dough extruded from the dispensing head is then cut off by upward movement of the valve disk 38 with respect to the tubular body member 12 and the dispensed dough drops into the oil 70 to form the doughnut 74 illustrated in Figure 3.

The above outlined procedure of forming doughnuts is continued until such time as all of the dough 58 has been dispensed from the container 54. At this time, there remains within the tubular body member 12 sufficient dough to make a number of additional doughnuts. In order that this additional dough may also be utilized, the connector 40 and the container 54 are removed from the tubular body member 12. Then, after the stop member 36 has been removed, the guide 16 is removed from the tubular body member 12. Next, the cover is slid down over the stem 34 into the upper portion of the tubular body member 12, as is best illustrated in Figure 5. The cover 60 then functions as a plunger to extrude the dough 58 remaining in the tubular body member 12 therefrom to form doughnuts in the same manner outlined above. Thus, it will be seen that all dough normally carried by the dough container 54 may be utilized in the formation of doughnuts without requiring the use of any additional cooking implements.

Although it is desirable to utilize the container in which the doughnut forming dough is originally packaged, in certain instances, other types of flexible containers may be found to be more desirable. For example, there are available flexible plastic containers with opposite ends thereof open. These containers are relatively inexpensive and cost is such that they may be thrown away, thereby reducing the cleaning problem.

As is best illustrated in Figure 3, when a doughnut has been dispensed, the valve disk 38 is retracted within the body member 12 and accidental escape of dough is prevented. Thus, a person using the dispensing head may feel free to lay the dispensing head aside while turning over doughnuts which are being fried.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A doughnut dispensing head for a flexible dough container, said dispensing head including a tubular body member terminating at one end in a sharp edge to facilitate the cutting of dough extruded through said body member, a guide fixedly carried within said body member, a stem guidingly carried by said guide for reciprocatory movement, a doughnut forming valve disk carried by said stem intermediate its ends, said valve disk being retractible into said body member and being of a size to form a seal of said body member, a removable cover receivable in the lower end of said tubular member to seal a dough container carried by said tubular body, said cover being of a size to be received in and form a seal with said body member, and an annular connector surrounding the upper end of said tubular body, said connector being connectable to a dough container and retaining said guide in place, said connector and said guide being removable, said cover being insertable in the upper end of said tubular body to force dough remaining in said tubular body therethrough to minimize the wasting of dough.

2. A doughnut dispensing head of claim 1 wherein said cover is cup-shaped and includes a central sleeve sealably receiving said stem.

3. The doughnut dispensing head of claim 1 wherein there is also provided stop means on an upper end of said stem engageable with said guide to limit downward movement of said stem and said disk valve, said stop means being removable to permit the removal of said guide and the positioning of said cover on the upper end of said stem.

References Cited in the file of this patent
UNITED STATES PATENTS

| | | |
|---|---|---|
| 1,124,495 | Mahn | Jan. 12, 1915 |
| 1,416,735 | Morris | Mar. 23, 1922 |
| 1,447,166 | Alumbaugh | Mar. 6, 1923 |
| 1,867,926 | Ruth | July 19, 1932 |
| 2,447,182 | Hutchinson | Aug. 17, 1948 |